United States Patent [19]

Advani et al.

[11] Patent Number: 4,466,065
[45] Date of Patent: Aug. 14, 1984

[54] QUEUING CAPABILITY IN A FOREGROUND TASK

[75] Inventors: Hira Advani, Austin; John A. Hooten, Round Rock, both of Tex.

[73] Assignee: International Business Machines Corporation, Armonk, N.Y.

[21] Appl. No.: 379,067

[22] Filed: May 17, 1982

[51] Int. Cl.³ ............................................. G06F 15/20
[52] U.S. Cl. ..................................................... 364/300
[58] Field of Search ................ 364/200 MS File, 300, 364/900 MS File; 235/377

[56] References Cited

U.S. PATENT DOCUMENTS 4,423,314 12/1983 Kato et al. ........................... 235/377

Primary Examiner—Raulfe B. Zache
Attorney, Agent, or Firm—Harold E. Meier

[57] ABSTRACT

The specification discloses a method for submitting a number of documents to be printed in a limited memory word processing system in which printing is a separate, nonconcurrent foreground task with typing functions. A set of print task programs is loaded into the system. A background print process is initialized for printing one or more documents. A document is submitted for printing by entering document identification information in a print queue. The document identification information includes the document name, the diskette name where the document is stored and the first and last pages of the document to be printed. The background print process sequentially prints each of the documents corresponding to the document information entered in the print queue on a first-in, first-out basis. The operator may cancel a document previously submitted for printing by deleting the document identification information corresponding to the document to be cancelled from the print queue. The operator may also change the print order of a designated document by moving document information corresponding to the designated document to a position in the queue immediately after the document which is currently being printed. The foreground print task and thus the background print process is thus terminated only when no print activity remains to be performed.

14 Claims, 6 Drawing Figures

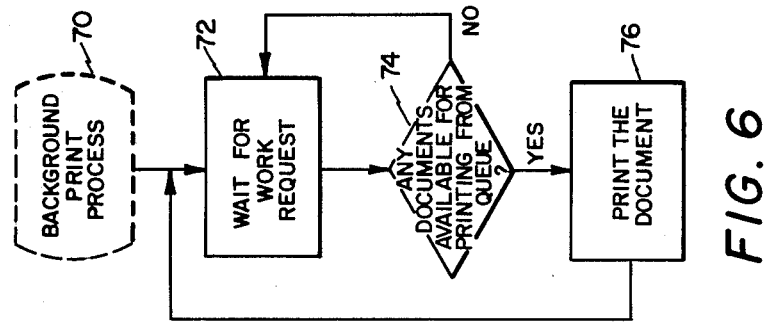
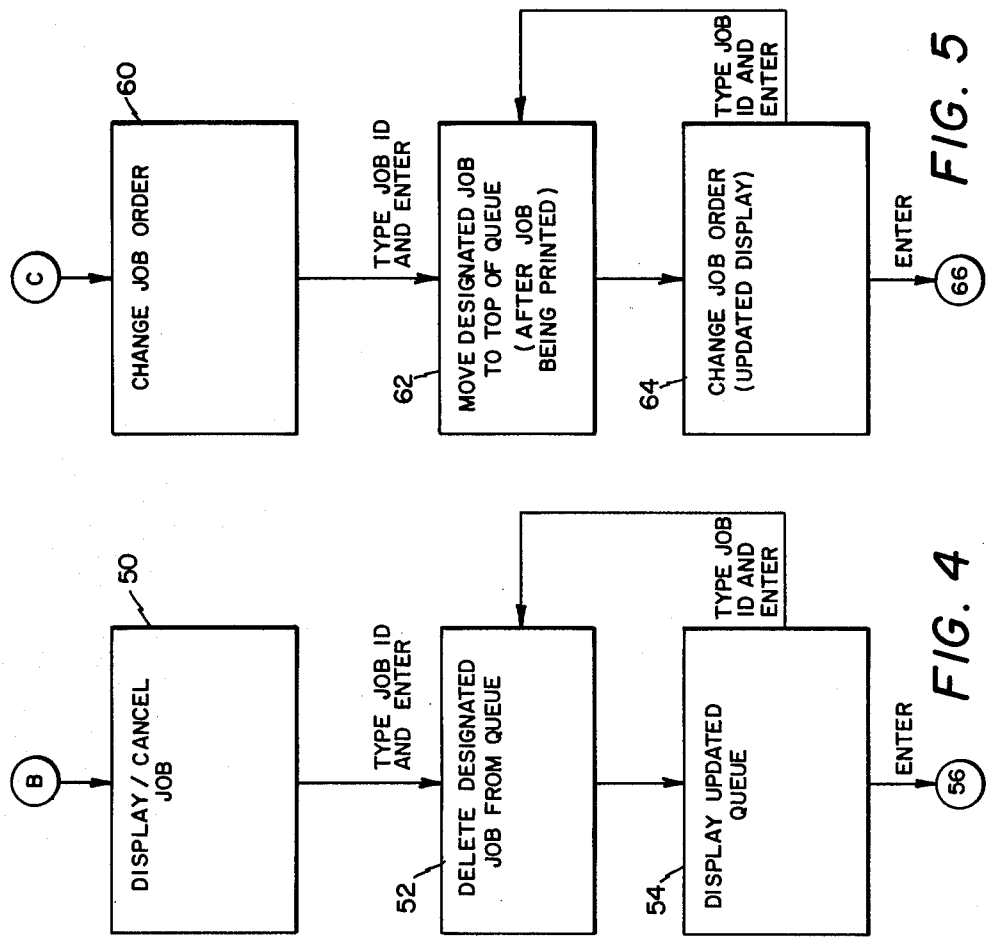

QUEUING CAPABILITY IN A FOREGROUND TASK

BACKGROUND OF THE INVENTION

1. Field of the Invention

The present invention pertains to word processing and more particularly to queuing of several documents for printing and in a separate foreground print task.

2. Description of the Prior Art

Numerous word processing systems have been developed for editing, processing and printing conventional alphanumeric text. In word processing, operator productivity is considerably enhanced, if the operator can submit several documents to be printed without waiting for the printing of each document to be completed, as generally occurs in the foreground task.

In large memory word processing systems, such as the IBM Displaywriter, printing is a background task which runs concurrently with typing tasks so that pages can be printed as the text is created or revised. In less expensive word processing systems, however, the available memory does not permit background printing concurrently with typing tasks. In such systems, documents must be printed by a separate printing task which is separately loaded into the memory after the typing tasks are complete. In systems in which typeing tasks an print tasks are not processed concurrently, but sequentially, a need arises for a method for queuing several documents to be printed as well as to permit the operator to interact with the document print queue during the printing process to submit additional documents, cancel documents previously submitted or change the order of any document to be printed.

BRIEF DESCRIPTION OF THE DRAWINGS

For a more complete understanding of the present invention and for further objects and advantages thereof, reference is now made to the following Detailed Description taken in conjunction with the accompanying Drawings in which:

FIG. 4 is a logical flow chart for the "cancel print job" task of the print task overlay;

FIG. 5 is a logical flow chart for the "change print order" task of the print task overlay; and FIG. 6 is a logical flow chart for the background printing process of the print task overlay.

SUMMARY OF THE INVENTION

According to the invention, a method for queuing several documents to be printed in a limited memory, word processing system of the type having separate, nonconcurrent typing and print tasks is provided. The print task is a foreground task. The background printing process is initialized for printing documents. A document to be printed is submitted by entering document identification information into a document print queue. The document identification information includes the document name, the disk where the document is stored and the first and last pages of the document to be printed. The background printing process then sequentially prints each document corresponding to the document identification information entered in the document print queue on first-in, first-out basis. The operator may cancel a submitted document by deleting the document identification information corresponding to that document from the print queue. Likewise, the operator may change the print document order of a submitted document by moving document identification information corresponding to the designated document to a position in the queue ahead of any documents which are not currently being printed. When all documents have been submitted for printing and the printing of all documents is complete, the print task, and thus the background print process is terminated.

DESCRIPTION OF THE BEST MODE

The present invention provides a method for submitting a number of documents to be printed during the execution of the print task overlay and provides the operator with the capability to interact with the document print queue to submit additional documents to be printed, to cancel the printing of a submitted document or to change the printing order of documents in the queue. Thus, in a print task overlay, which is a foreground task, the operator has effectively been provided with the capability of an asynchronous background printing process.

Figure 1:
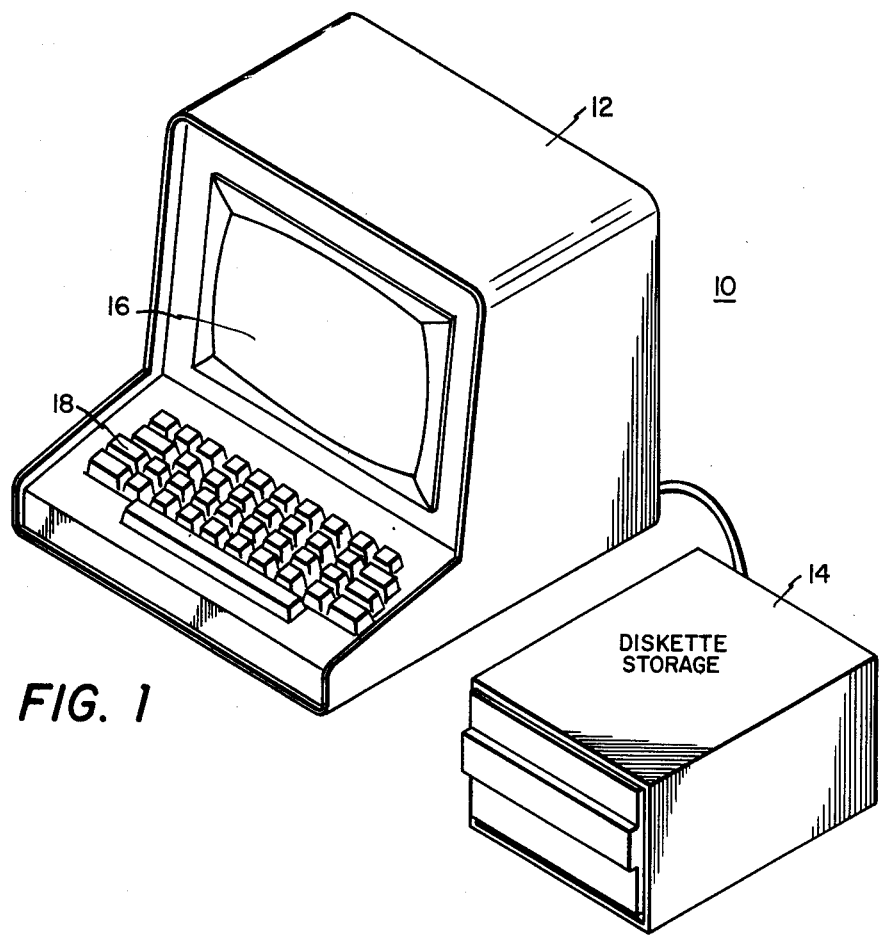
FIG. 1 is a perspective view illustrating a work station comprising a cathode ray tube display, screen and a keyboard with a station connected to a main store consisting of a diskette storage unit.

Referring now to FIG. 1, there is illustrated an information processing system 10 which comprises a work station 12 connected to an auxiliary store, which in this system is a diskette storage 14. The work station 12 includes a display screen 16, which is typically a cathode ray tube. Work station 12 further includes a keyboard 18, which has keys for entering alphanumeric characters, as well as predefined commands.

In operation, the operator enters commands through keyboard 18 to call up information which is stored in diskette storage 14. The operator's command may consist of one or more keystrokes. The information which is called up is displayed on display screen 16 so that the operator can edit the displayed information to accomplish such tasks as entering new information, revising information, moving information from one location to another and deleting stored information. The operator also has the capability to manipulate the stored information to perform other operations, to select and modify documents or records stored in diskette storage 14. Thus, the operator has the capability of carrying out conventional word processing editing together with data base manipulations.

Figure 2:
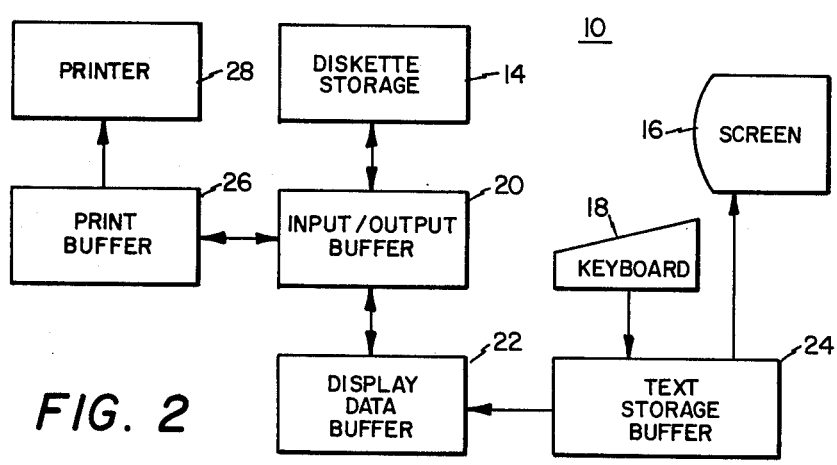
FIG. 2 is a block diagram of the functional units of the system illustrated in FIG. 1.

Referring to FIG. 2, there is illustrated a functional block diagram of the operational elements of the present system. The information flow is described as follows. An information file is stored in the diskette storage 14. The file is made up of one or more documents. Each document is made up of text fields. Text fields contain alphanumeric and function characters as well as control characters such as line end codes, page end codes, tabs and carriage returns, which indicate the nature and location of alphanumeric and function characters on the display screen 16.

The operator enters a command into the keyboard which causes the document to be read from the diskette storage 14. The document is transmitted to an input-/output buffer 20 where it is temporarily stored. The document in the input/output buffer 20 is then transmitted to a display data buffer 22. The document in display data buffer 22 is transferred to a text storage buffer 24. Screen 16 displays the information stored in text storage buffer 24. The displayed document is edited by the operator by entering commands and characters through keyboard 18 to alter the fields stored in text storage buffer 24. After editing is completed, the text field in text storage buffer 24 is returned to display data buffer 22 and incorporated into the text. This produces an edited document which the operator can then cause to be transferred into the input/output buffer 20 for storage on the diskette storage 14. At a later time, when the print task overlay is selected by the operator, the edited documents are retrieved from the diskette storage 14 to the input/output buffer 20 where it is furnished to a print data buffer 26 and eventually printed out by the printer 28 under the interactive control of the operator by the process of the present invention.

After the system 10 has been initially powered on and the basic assurance tests have been successfully completed and the system has been IPL'd, a task selection manu show in Table I is displayed:

I). When the task selection menu is displayed, the operator selects a task set by typing the appropriate ID on the prompt line and depressing the Enter key. Once the Enter key is depressed, the program for that selected task set will be loaded into the system, unless it is already loaded. When the operator completes a task set, the operator is returned to the task selection menu to reselect the same task or select a different task. By breaking tasks into groups and separately loading task set programs, a large memory capacity capable of holding all task programs is not required.

In a word processing system, typical task sets include typing tasks, work diskette tasks, program diskette tasks, print tasks and paginate tasks. Since only one set of task programs is loaded at any given time, it will be apparent that in this system the typing tasks, such as document creation or revision, cannot be carried out concurrently with print tasks. In the present invention, only print tasks are of concern since it is only during the print task overlay tht the operator has the ability to submit documents to be printed, and to interact with the background printing process.

All printing occurs when the print task selection is

TABLE I

```
 PRODSK  |     |     |     |     | Kyb 1 |
                 TASK SELECTION

ID   ITEM a   Typing Tasks*
                        Create, or Revise Documents
                  b   Work Diskette Tasks:
                        Delete or Duplicate Documents,
                        Duplicate, Condense or
                        Erase/Initialize (Name) Diskette, Change
                        Document or Diskette Name, Recover Documents c   Program Diskette Tasks:
                        Default Formats, Duplicate Setups,
                        Printer and Work Station Description,
                        Duplicate and Erase Program Diskette
                  d   Paginate Task
                  e   Print Tasks Type ID letter to choose ITEM; press ENTER: □
```

Tasks are grouped into sets which have similar characteristics as defined by the task selection menu (Table I). made from the task selection menu. Table II illustrates the print task selection menu which is displayed:

TABLE II

```
 DSK001  |     |     |     |     | Kyb 1 |
                    PRINT TASKS

ID   ITEM a   Print Document
                  b   Display Print Queue or Cancel Print Job
                  c   Change Printing Order d   Print Index of Diskette Contents e   Continue Printing With Element Now On Printer
```

TABLE II-continued

```
    f    Key to Print g    Go to Task Selection

Type ID letter to choose ITEM; press ENTER: ☐
```

Figure 3:
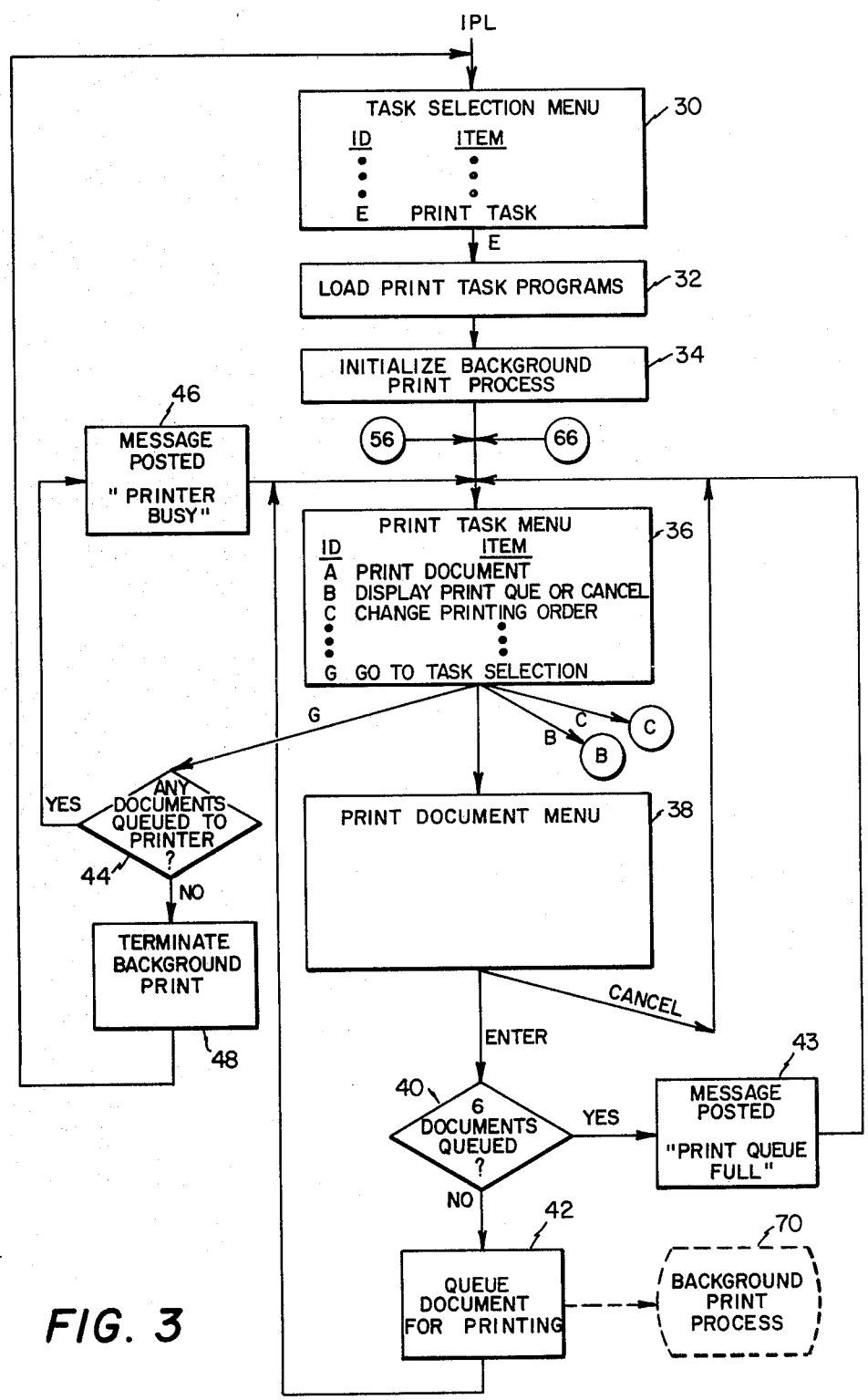
FIG. 3 is a logical flow chart illustrating the "print document" and "go to task selection" features of the print task overlay.

Reference is now made to FIG. 3, which illustrates the foreground features of the print task overlay. When the system has been IPL'd, the task selection menu (Table I) is displayed to the operator at step 30. When the print tasks selection, item E is entered, the print task programs are loaded at 32 and the background print process is initialized at step 34. The print task menu is then displayed at step 36. This gives the operator the option of submitting (or adding) a document to be printed, cancelling a document from the document print queue or changing the print order of the documents in the queue. When the operator selects the "print document" task and presses the Enter key, the system will prompt the operator for the document name and the diskette name. Once the operator has specified the document name and diskette name, the print dodument menu will be displayed at step 38. Table III illustrates the print document menu:

TABLE III

```
                      |Brief          |              |
DSK001   |       |              |           | Kyb 1 |
                         PRINT DOCUMENT

YOUR        POSSIBLE
   ID    ITEM        CHOICE      CHOICES a     Print From Page   0     0 = First Page,
                                 1 — 9999.9.9
   b     Print Through Page 0    0 = Last Page,
                                 1 — 9999.9.9
   c     Print Quality     1     1 — 99 d     Paper Handling    2     1 = Cut Paper, Manual Feed
                                 2 = Cut Paper, Automatic Feed
                                 3 = Continuous Paper e     Cancel on Error   2     1 = Yes    2 = No When finished with this menu, press ENTER.

Type ID letter to choose ITEM; press ENTER: ☐
```

The print document menu lists the various print control options the operator may select to control the printing process. The "print from page" option defines the first page of the document the operator desires to print; similarly, the "print through page" option, the last page to be printed. The number of copies desired is specified by the "print quantity" option; the type of paper (cut or continuous) that is to be used is specified by the "paper handling" option. When the "cancel on error" option is exercised, an indicator is sent to the system to terminate the print job if a print error is detected.

If an error is made in designating the parameter of the printing process, the operator can cancel the selection and the print task menu will again be displayed. Otherwise, when the pages to be printed have been specified and the appropriate options have been entered, the system determines at step 40 if more than six documents have been queued for printing. If the queued document limit has not been exceeded, the document is queued for printing at step 42. At this point a data string identifying the document to be printed, the diskette where the document is stored and the print control parameters specified by the operator in step 36 is placed in the print document queue and a request is generated to the background printing process to print the document. The dotted line in FIG. 3 indicates that the document is then queued to the background printing process as described hereafter in FIG. 6. Once the document has been placed in the print queue, the operator is returned to step 36 where the print task menu is again displayed. This permits the operator to specify another document for printing by entry of the appropriate information at steps 36 and 38. If the document limit is not exceeded, the document is queued and the print task menu is again displayed until the document limit is either exceeded or there are no more documents to be printed.

If the document limit is exceeded at step 40, a message is posted at step 43 indicating that the "print queue is full" and the print task menu is again displayed. At this point, the operator must wait until the document currently being printed is complete before another document may be queued for printing.

When the operator has specified the complete list of documents to be printed, the "go to task selection," item G on the print task menu, is selected at step 36. A check is then made at step 44 to determine whether any documents are queued to the printer. If so, a message is posted at step 46 indicating that "the printer is busy" and the print task menu is than displayed at step 36. This insures that this foreground task cannot be exited until all print activity for this task have been completed. When the operator has selected item G on the print task menu and no documents remain queued to the printer, the print task and thus the background print process is terminated at step 48 and the task selection menu is displayed at step 30 indicating that the printing task is complete and that the operator may now choose another task.

When the operator wishes to cancel a job already in the printing queue, item B on the print task menu is selected. (See Table II) Item B, which is the display or cancel print job task allows the operator to display the status of the print queue for the work station and to cancel a job submitted from the work station that is printing or remove a job from the print queue.

FIG. 4 illustrates the logic of the "cancel print job" option. A display/cancel print job menu is displayed at step 50 when item B in the print task menu is selected. Table IV illustrates the display/cancel job menu.

TABLE IV

```
┌─────────────────────────────────────────────────────────────────┐
│ DSK001   |     |     |     |     | Kyb 1 |                     │
│          DISPLAY PRINT QUEUE OR CANCEL PRINT JOB                │
│                                                                 │
│   ID    DISKETTE NAME        DOCUMENT NAME                      │
│                                                                 │
│   #a    DSK001               Memo1                              │
│    b    DSK001               Memo2                              │
│    c    AMH1                 Doc9                               │
│                                                                 │
│ # This document is printing now.                                │
│                                                                 │
│ When finished with this menu, press ENTER.                      │
│                                                                 │
│ Type ID letter to cancel print job; press ENTER: ☐              │
└─────────────────────────────────────────────────────────────────┘
```

The display/cancel print job menu shows, for each job in the printing queue, the document name and the diskette name. A special indicator (#) indicates, if appropriate, that the associated job is currently printing. To cause a job that is printing (or waiting to be printed) to be cancelled, the operator selects the job by keying its ID and depressing the Enter key as instructed in the menu.

If the job to be cancelled is currently printing, its printing will be aborted, the current page will be ejected and the next job in the queue (if there is one) will be started at step 52. If the job to be cancelled is not printing, the job will simply be removed from the printing queue. In either case, the display will be updated to represent the new print queue with the cancelled job omitted at step 54. At this point, the operator can select and cancel another job, or the operator can return to the print task menu by pressing the Enter key at 56.

When the operator desires to change the printing order of a job in the document print queue, item C of the print task menu is selected. Item C, which is the change printing order task, allows the operator to cause a job that has been placed in the queue and which is waiting to be printed to be moved to the top of the queue.

Referring to FIG. 5, the logic of the change job order task is illustrated. When item C of the print task menu is specified and entered at step 36 (FIG. 3), a change job order menu is displayed at step 60 as shown in FIG. 6.

Table V illustrates the change printing order job menu, which is similar to the display/cancel print job menu:

TABLE V

```
┌─────────────────────────────────────────────────────────────────┐
│ DSK001   |     |     |     |     | Kyb 1 |                     │
│                    CHANGE PRINTING ORDER                        │
│                                                                 │
│   ID    DISKETTE DISPLAY     DOCUMENT NAME                      │
│                                                                 │
│   #a    DSK001               Memo2                              │
│    b    AMH1                 Doc9                               │
│    c    LJL3                 Memo1                              │
│                                                                 │
│ # This document is printing now.                                │
│                                                                 │
│ When finished with this menu, press ENTER.                      │
│                                                                 │
│ Type ID letter to choose ITEM; press ENTER: ☐                   │
└─────────────────────────────────────────────────────────────────┘
```

The indicator (#) indicates, when appropriate, the job which is currently printing. To cause a job that is waiting to be printed to be moved ahead to the top of the queue, the operator selects the job by keying in its ID and pressing the Enter key. The job will be moved to the top of the queue and will be placed after the job that is currently printing, if applicable at step 62. The display will be updated to represent the new print queue with the moved job in its new queue position at step 64. The operator returns to the print task menu by pressing the Enter key when all order changes have been entered. If additional changes in the order of the queued documents is desired, such changes are made in the updated display at 64.

FIG. 6 illustrates the logic of the background printing process 70 which operates asynchonously with the foreground printing tasks which provide operator interaction with the print queue. Once initialized at step 34 (FIG. 3), the background printing process 70 waits for a work request at step 72. When a request is received, the printing queue at step 74 is interrogated to determine if a document is available for printing. If not, the process waits for another request from step 42 (FIG. 3). When a document is available for printing, the document is printed at step 76 and the background printing process 70 waits for a new document request. The process is repeated until the background printing process 70 is terminated at step 48 of FIG. 3.

The present invention thus provides a method of submitting a number of jobs to be printed and permits the operator to interact with the background printing process by submitting or adding jobs, cancelling jobs or changing the order of jobs specified in the document print queue within the foreground print task overlay.

Whereas the present invention has been described by reference to specific embodiments thereof, it will be understood that various changes and modifications will be suggested to one skilled in the art, and it is intended to encompass such changes and modifications as fall within the scope of the appended claims:

What is claimed is:

1. A method for queuing documents to be printed in a foreground task of a word processing system, comprising the steps of:
   (a) initializing a print task and a background print process for printing a document;
   (b) submitting a document to be printed by entering document identification information in a document print queue;
   (c) sequentially printing each document corresponding to document identification information entered in said print queue in step (b) on a first-in, first-out basis;
   (d) repeating step (c) by entering document identification information for each additional document to be printed until all documents to be printed have been submitted; and
   (e) terminating the print task and the background print process when all submitted documents in step (b) have been printed.

2. The method of claim 1 wherein said document identification information includes the document name and the diskette name where said document is stored.

3. The method of claim 1 wherein up to six documents may be entered in said document print queue.

4. The method of claim 1 further comprising the step of:
   (f) cancelling a document previously submitted in step (b) by deleting the document identification information corresponding to said cancelled document from said print queue.

5. The method of claim 1 further comprising the step of:
   (g) changing the print order of a designated document submitted in step (b) by moving document identification information corresponding to said document to the head of said document print queue.

6. The method of claim 5 wherein document identification information corresponding to said designated document is moved to the position in said queue immediately following information corresponding to a document currently being printed.

7. The method of claim 1 wherein said document identification information includes the first and last pages of the document to be printed.

8. The method of claim 1 wherein said document identification information includes the number of copies of the document to be printed.

9. The method of claim 1 wherein said document identification information includes information designating continuous or cut paper feed.

10. A method for queuing documents to be printed in a foreground task of a word processing system, comprising the steps of:
    (a) loading a set of print task programs into the system;
    (b) initializing a print task and background print process for printing a document;
    (c) interrogating a document print queue to determine positively or negatively if six or fewer documents have been submitted for printing;
    (d) submitting a document to be printed by entering document identification information into a document print queue when the result of step (c) is positive, said document identification information including the document name, the diskette on which said document is stored and said first and last pages thereof to be printed;
    (e) sequentially printing each of the documents corresponding to the document information entered in said print queue in step (d) on a first-in, first-out basis;
    (f) repeating step (d) by entering document identification information in said queue for each additional document until the operator has submitted all documents to be printed, or, until the result of step (d) is negative;
    (g) if the result of step (c) is negative, displaying a message to the operator indicating that said print queue is full;
    (h) interrogating the background print process to determine positively or negatively if any printing activity is occurring; and
    (i) if the result of step (h) is negative, terminating the print task and background print process when the operator has elected to go to a nonprinting task.

11. The method of claim 10 further comprising the step of:
    (i) cancelling a document previously submitted in step (d) by deleting document identification information corresponding to said document to be cancelled from said print queue.

12. The method of claim 10 further comprising the step of:
    (j) changing the print order of a selected document previously specified in step (c) by moving the document identification information corresponding to said document to a place in said queue ahead of any document which is not currently being printed.

13. A method of queuing documents in a foreground task of a word processing system, comprising the steps of:
    (a) loading a set of print task programs into the system for printing one or more documents previously processed in a separate typing task;
    (b) initializing a background print process for printing one or more of said documents;
    (c) displaying a print task menu to the operator, said menu including the following items:
    a print document selection, a cancel document selection, and
a change print order selection;
(d) selecting one of the items on the menu displayed in step (c);
(e) submitting a document to be printed by entering document identification information in a print queue when the print document selection is chosen in step (d), said document identification information including the document name, the name of the diskette where said document is stored and the first and last pages of said document to be printed;
(f) sequentially printing each document corresponding to the document information entered in the print queue in step (e) on a first-in, first-out basis;
(g) cancelling a designated document previously submitted in step (e) by deleting document identification information corresponding to said document to be cancelled from said print queue when the cancelled document selection is chosen in step (d);
(h) changing the print order of a designated document submitted in step (e) by moving document information corresponding to said designated document to a position in said queue ahead of the document which is not currently being printed when the change print order selection is made in step (d);
(i) repeating steps (e), (g) or (h) until all documents have been submitted and printed; and
(j) exiting from the print task programs and terminating the background print process and initialized in step (b).

14. A method of queuing documents to be printed in a word processing system, comprising the steps of:
(a) loading a set of print task programs into the system for printing one or more documents previously processed in a separate typing task;
(b) initializing a background printing process for printing one or more of said documents;
(c) displaying a print task menu to the operator including the following items:
a print document selection,
a cancel document selection,
a change print order selection, and
a go to task selection;
(d) selecting one of the items on the menu displayed in step (c);
(e) interrogating a print queue to determine positively or negatively whether the number of documents submitted for printing is more than six;
(f) submitting a document to be printed by entering a document identification information in a print queue when the print document selection is chosen in step (d) and when the results of the interrogation in step (e) is negative, said document identification information, including the document name, the diskette name where said document is stored and first and last page of said document to be printed;
(g) displaying a message to the operator indicating that the print queue is full when the result of the interrogation in step (e) is positive;
(h) sequentially printing each of the documents corresponding to the document information entered in said print queue in step (f) on a first-in, first-out basis;
(i) repeating any of steps (f)–(h) until the go to task selection displayed in step (c) is selected in step (d); and
(j) interrogating the background print process to determine positively or negatively if any printing activity is occurring;
(k) terminating the print process initialized in step (b) and exiting from the print task programs when the go to task selection is selected in step (d) and all documents submitted in step (f) having been printed;
(l) cancelling a designated document previously submitted for printing in step (f) by deleting document identification information corresponding to said document from said print queue when cancelled document selection is chosen in step (d);
(m) changing the print order of a selected document previously submitted in step (f) by moving document information corresponding to said document to a place in said queue ahead of any document which is not being printed when the change print order selection is made in step (d).

* * * * *